US006590145B2

(12) United States Patent

Doiron

(10) Patent No.: US 6,590,145 B2
(45) Date of Patent: Jul. 8, 2003

(54) LOCKING GUITAR STRAP

(76) Inventor: Jeffrey Wayne Doiron, 1815 N. Dixie, Elizabethtown, KY (US) 42701

( * ) Notice: Subject to any disclaimer, the term of this patent is extended or adjusted under 35 U.S.C. 154(b) by 62 days.

(21) Appl. No.: 09/894,370

(22) Filed: Jun. 27, 2001

(65) Prior Publication Data

US 2002/0000153 A1 Jan. 3, 2002

Related U.S. Application Data

(60) Provisional application No. 60/215,608, filed on Jun. 30, 2000.

(51) Int. Cl.[7] .......... G01D 3/00

(52) U.S. Cl. .......... 84/327

(58) Field of Search .......... 84/327, 329; 24/163 R, 24/433, 326, 164–166, 168, 265, 174, 643, 186, 187; 224/686, 225, 645, 286, 245, 259, 266

(56) References Cited

U.S. PATENT DOCUMENTS

| | | | | | |
|---|---|---|---|---|---|
| 681,699 | A | | 9/1901 | Ehewson | |
| 723,234 | A | | 3/1903 | Bowker | |
| 970,931 | A | | 9/1910 | Kramer | |
| 1,463,949 | A | | 8/1923 | Gerber | |
| 3,597,812 | A | * | 8/1971 | Allan | 24/245 |
| 3,688,012 | A | * | 8/1972 | Vettel | 84/327 |
| D245,130 | S | * | 7/1977 | Perrin | D2/444 |
| 4,145,583 | A | | 3/1979 | Oshgan et al. | |
| 4,271,999 | A | | 6/1981 | Stravitz | |
| 4,419,794 | A | | 12/1983 | Horton, Jr. et al. | |
| 4,993,127 | A | | 2/1991 | Mechem et al. | |
| 5,054,170 | A | | 10/1991 | Otrusina | |
| 5,177,837 | A | * | 1/1993 | Rekuc | 24/198 |
| 5,850,996 | A | | 12/1998 | Liang | |
| 5,868,293 | A | * | 2/1999 | D'Addario et al. | 224/257 |
| 5,880,384 | A | | 3/1999 | Beck | |
| 6,305,535 | B1 | * | 10/2001 | Fair | 206/315.3 |
| 6,457,620 | B1 | * | 10/2002 | Batten et al. | 224/645 |

OTHER PUBLICATIONS www.zzounds.com*
www.music123.com*

* cited by examiner

*Primary Examiner*—Kim R. Lockett
(74) *Attorney, Agent, or Firm*—Kerrick, Grise, Stivers & Coyle; Laura M. Hagan

(57) ABSTRACT

The locking guitar strap is a guitar strap, which can be securely attached to the button of a guitar or other stringed instrument by means of a locking mechanism mounted internally into the end tab of the guitar strap, thus preventing damage to the instrument by accidental disengagement of the strap from the instrument.

5 Claims, 2 Drawing Sheets

LOCKING GUITAR STRAP

This application claims priority to provisional patent application 60/215,608 filed on Jun. 30, 2000.

BACKGROUND OF THE INVENTION

This invention relates generally to a guitar strap capable of securely connecting to a stringed instrument.

REVIEW OF PRIOR ART

Typical guitar straps have end tabs that are comprised of leather or some other similar material, and each of these end tabs has a slit with a small circular opening at one end of the slit, capable of receiving and, therefore, connecting to a guitar button. These straps are not capable of securely connecting the guitar strap to the guitar button and pose the risk of accidental disengagement that could cause damage to a guitar. Additionally, after significant use, the circular opening in the end tab is subject to wear and tear, which further decreases its ability to securely maintain the guitar button.

Other strap locking devices consist of an externally mounted apparatus placed onto the guitar button. These externally mounted apparatuses are often bulky and are not easily transferred from one guitar to another. They also pose the risk of scratching the surface of the guitar body.

SUMMARY OF THE INVENTION

The locking guitar strap of the present invention provides a means to safely and securely attach a guitar strap to a guitar button by means of a locking mechanism internally mounted within the end tabs of the guitar strap. The end tabs each have a keyhole opening with a wider first end and a narrower second end. The locking mechanism is comprised of an opening with a short narrow first section, a wider second section and a narrow third section. The wider second section and the narrow third section are aligned with the keyhole openings in the end tabs. A flexible tongue extends transversely from the short narrow first section through the entire wider second section and a portion of the narrow third section of the locking mechanism. The tongue is capable of being deflected so as to allow a guitar button to be inserted into the wider second section of the opening of the locking mechanism and the wider first end of the keyhole opening of the end tabs. The narrower second end of the keyhole opening in the end tabs and narrow third section of the locking mechanism allow only for the neck of the guitar button to be fitted within the opening. Once the guitar button is fitted into the narrow second end of the keyhole opening and the narrow third section of the locking mechanism, the tongue returns to its original position and serves to "lock" the guitar button to the locking guitar strap. In the locked position, the guitar button is prevented from returning to the wider first opening of the keyhole opening and the wider second section of the locking mechanism and thus disengaging from the locking guitar strap. The guitar button is released by deflecting the tongue to enable the head of the guitar button to slide underneath the tongue and into the wider first end of the keyhole opening and wider second section of the locking mechanism, thus releasing the locking guitar strap.

The locking mechanism does not experience the wear and tear experienced by the leather end tabs of typical guitar straps and, thus, consistently maintains the secure attachment of the guitar strap to the guitar button, preventing the possibility of accidental disengagement. The internal mounting of the locking mechanism within the leather end of the guitar strap virtually eliminates the possibility of scratching the surface of the body of the guitar. Finally, the locking guitar strap will accommodate most standard guitar buttons without a need for modification of the guitar button. This versatile feature allows the owner of the locking guitar strap to utilize one locking guitar strap with any number of guitars.

DETAILED DESCRIPTION OF THE PREFERRED EMBODIMENT

Figure 5:
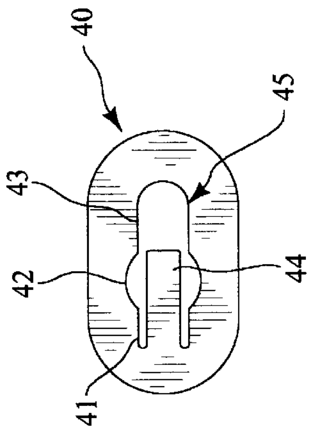
FIG. 5 shows an alternative embodiment of the locking mechanism used with the present invention.

For the purposes of promoting an understanding of the principles of the invention, reference will now be made to the embodiment illustrated in the drawings, and specific language will be used to describe the same. It will nevertheless be understood that no limitation of the scope of the invention is thereby intended; such alterations and further modifications in the illustrated device and such further applications of the principles of the invention as illustrated therein being contemplated as would normally occur to one skilled in the art to which the invention relates.

Figure 2:
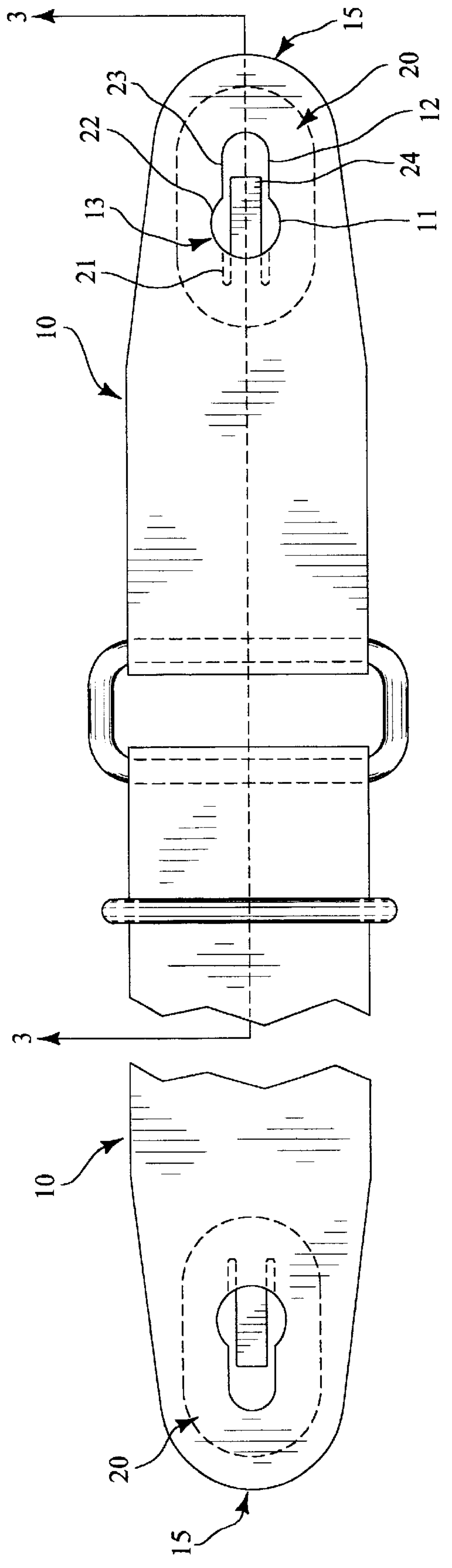
FIG. 2 is a top view of the present invention.

Referring now to the drawings in detail, an end tab 10 of the locking guitar strap 15 is shown in FIG. 2. Each locking guitar strap 15 has at least two end tabs 10. The end tab 10 is typically made of a leather or leather-like material. The end tab 10 may also be made of any similar durable material. The end tab 10 contains a keyhole opening 13 that has a wider first end 11 and a narrower second end 12.

Figure 1:
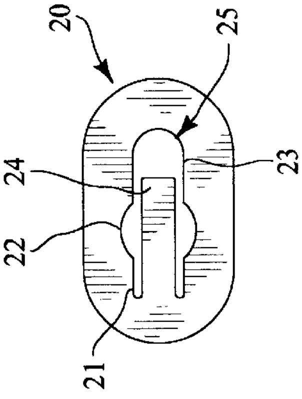
FIG. 1 is a top view of the locking mechanism.

A locking mechanism 20 is internally mounted into the end tab 10 of the locking guitar strap 15 as is shown in FIG. 2. This locking mechanism 20, as is shown in FIG. 1, is typically comprised of a flat sheet metal, but could be comprised of a variety of semi-rigid materials. The outer shape of the locking mechanism 20 is shown as an oval, but could be of numerous different shapes capable of fitting within the end tab 10. A locking mechanism has an opening 25 that consists of a short narrow first section 21, a wider second section 22 and a narrow third section 23. Attached to the short narrow first section 21 is a flexible tongue 24 that extends through the entire short narrow first section 21 and the wider second section 22 and through a small portion of the narrow third section 23.

FIG. 5 shows an alternative embodiment of the locking mechanism 40. In this alternative embodiment, the opening 45 also has a short narrow first section 41, a wider second section 42 and a narrow third section 43. A flexible tongue 44 is also connected to the short narrow first section 41 and extends through the entire short narrow first section 41 and the entire wider second section 42 and does not extend into the narrow third section 43 of the opening 45.

When internally mounted into the end tab 10, the wider second section 22 and the narrow third section 23 of the locking mechanism 20 are aligned with the keyhole opening 13 of the end tab 10. The only exposed portion of the internally mounted locking mechanism 20 is the flexible tongue 24. This minimum exposure of metal or other semi-rigid material serves to minimize any possibility that damage may occur to the surface of the guitar body as a result of contact with metal.

Figure 4:
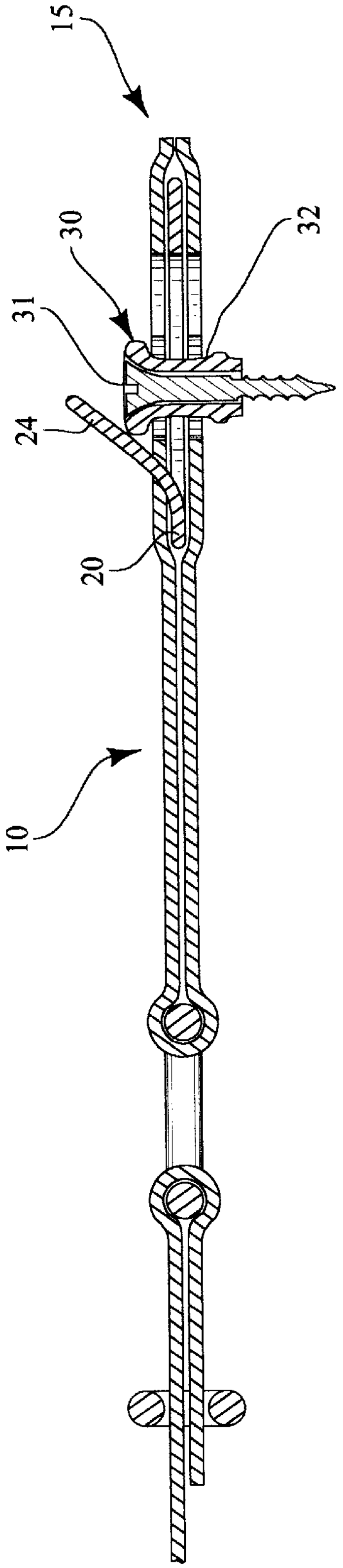
FIG. 4 is a cross sectional view of a locking guitar strap disengaging from a guitar button, FIG. 4 being taken substantially along lines 3—3 of FIG. 2.

A typical guitar button 30 has a head 31 and a neck 32 portions. The head 31 is larger in diameter, while the neck 32 more narrow. FIG. 4 shows how a guitar button 30 is attached to the locking guitar strap 15. The first end 11 of the keyhole opening 13 of the end tab 10, which is aligned with the wider second section 22 of the opening 25 on the locking mechanism 20, is capable of receiving the head 31 of a guitar button 30. The flexible tongue 24 is capable of deflecting to allow insertion of the head 31 of the guitar button 30.

Figure 3:
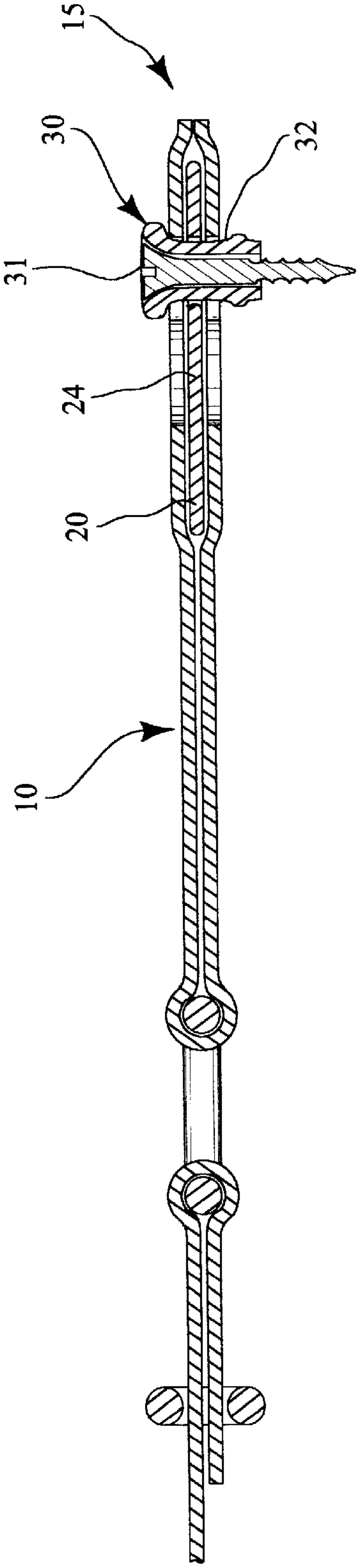
FIG. 3 is a cross sectional view of a guitar button engaged with the locking guitar strap in the locked position, FIG. 3 being taken substantially along lines 3—3 of FIG. 2.

The neck 32 of the guitar button 30 is moved into the second end 12 of the keyhole opening 13 of the end tab 10, which is aligned with the narrow third section 23 of the locking mechanism 20. Once this occurs, FIG. 3 illustrates how the flexible tongue 24 returns to its original position and serves to lock the guitar button 30 into the second end 12 of the keyhole opening 13 of the end tab 10. The flexible tongue 24 prevents the guitar button 30 from sliding back into the first end 11 of the keyhole opening 13 of the end tab 10.

To release or "unlock" the guitar button 30 from the locking guitar strap 15, the flexible tongue 24 is deflected by the user of the locking guitar strap 15 to allow the guitar button 30 to be moved into the first end 11 of the keyhole opening 13 of the end tab 10. Once moved into this position, the guitar button 30 is capable of being released or unlocked from the locking guitar strap 15.

I claim:

1. A locking guitar strap, comprising:

at least one end tab, said end tab having a keyhole shaped opening with said opening having a wider first end and a narrower second end;

a locking mechanism internally mounted into said end tab, wherein said locking mechanism has of an opening with a narrow first section, a wider second section and a narrow third section;

said locking mechanism further having a flexible tongue extending through said narrow first section and wider second section and a portion of the narrow third section;

said wider first end of said keyhole shaped opening of said end tab aligned with said wider second section of said locking mechanism and said narrower second end of said keyhole shaped opening of said end tab aligned with said narrow third section of said locking mechanism.

2. A locking guitar strap of claim 1, wherein said first end of said keyhole shaped opening of said end tabs and said wider second section of said locking mechanism are wide enough to admit a button of a guitar therethrough and said second end of said keyhole opening of said end tab an&said narrow third section of said locking mechanism are narrowed so that only a neck of said button of said guitar can be fitted therein.

3. The locking guitar strap of claim 1, wherein said flexible tongue is capable of deflection to allow insertion of a guitar button into said end tab.

4. A locking guitar strap, comprising:

at least one end tab, said end tab having a keyhole shaped opening with said opening having a wider first end and a narrower second end;

a locking mechanism internally mounted into said end tab, wherein said locking mechanism is comprised of an opening having a narrow first section, a wider second section and a narrow third section;

said locking mechanism further comprised of a flexible tongue extending throughout the entirety of said narrow first section and wider second section;

said wider first end of said keyhole shaped opening of said end tab aligned with said wider second section of said locking mechanism and said narrower second end of said keyhole shaped opening of said end tab aligned with said narrow third section of said locking mechanism.

5. A locking guitar strap in combination with a guitar having a button thereon, comprising:

at least one end tab, said end tab having a keyhole shaped opening with said opening having a wider first end and a narrower second end;

a locking mechanism internally mounted into said end tab, wherein said locking mechanism has an opening with a narrow first section, a wider second section and a narrow third section;

said locking mechanism further having a flexible tongue extending through said narrow first section and wider second section and a portion of the narrow third section;

said wider first end of said keyhole shaped opening of said end tab aligned with said wider second section of said locking mechanism and said narrower second end of said keyhole shaped opening of said end tab aligned with said narrow third section of said locking mechanism;

wherein said button on said guitar has a larger head portion and a narrower neck portion, said narrow neck portion extending through said opening on said locking mechanism, said flexible tongue engaging said head portion of said button and biasing said head portion of said button in said narrow second end of said end tab and said narrow third section of said locking mechanism.

* * * * *